US006990538B2

(12) United States Patent
Rojas et al.

(10) Patent No.: US 6,990,538 B2
(45) Date of Patent: Jan. 24, 2006

(54) SYSTEM COMPRISING A STATE MACHINE CONTROLLING TRANSITION BETWEEN DESKEW ENABLE MODE AND DESKEW DISABLE MODE OF A SYSTEM FIFO MEMORY

(75) Inventors: Edmundo Rojas, Fort Collins, CO (US); Hui-Sian Ong, West Wing (SG)

(73) Assignee: Agilent Technologies, Inc., Palo Alto, CA (US)

( * ) Notice: Subject to any disclaimer, the term of this patent is extended or adjusted under 35 U.S.C. 154(b) by 587 days.

(21) Appl. No.: 10/180,675

(22) Filed: Jun. 26, 2002

(65) Prior Publication Data

US 2004/0078665 A1    Apr. 22, 2004

(51) Int. Cl.
*G06F 3/00*   (2006.01)
*H04L 1/00*   (2006.01)
*H04L 12/28*  (2006.01)
(52) U.S. Cl. .................. 710/14; 370/225; 370/431
(58) Field of Classification Search ............... 370/457, 370/225, 431, 464; 710/14; 713/1
See application file for complete search history.

(56) References Cited

U.S. PATENT DOCUMENTS 5,469,449 A * 11/1995 Park ........................... 714/767
5,577,023 A * 11/1996 Marum et al. ............... 370/225
6,202,102 B1 * 3/2001 Kuroiwa et al. .............. 710/14
6,751,235 B1 * 6/2004 Susnow et al. ............. 370/503

OTHER PUBLICATIONS

IBM, Data Reordering System for Error Correction Codes, Jun. 1, 1993, vol. 36, issue 6B, pp. 559-562.*

* cited by examiner

Primary Examiner—Thomas Lee
Assistant Examiner—Suresh K Suryawanshi (57) ABSTRACT

A method and apparatus for managing a communication system including multiple links is presented. A receiver including a First-In, First-out (FIFO) memory receives information communicated on the links. A FIFO is associated with each communication link. Information is written into the FIFO based on a transmitter clock. Information is read out of the FIFO using a receiver clock. The FIFO is used to deskew data communicated across the communication links and re-synchronize the data between the transmitter clock and the receiver clock. A state machine controls the information read out of the FIFO. The state machine includes a deskew enabled state, a deskew disabled state and a reset state. Using the FIFO, the system is able to self reset and transition between the deskew enabled state and the deskew disabled state.

20 Claims, 3 Drawing Sheets

Fig. 3

SYSTEM COMPRISING A STATE MACHINE CONTROLLING TRANSITION BETWEEN DESKEW ENABLE MODE AND DESKEW DISABLE MODE OF A SYSTEM FIFO MEMORY

BACKGROUND OF THE INVENTION

1. Field of the Invention

The present invention relates to communications systems. Specifically, the present invention relates to resetting communications systems.

2. Description of the Related Art

A Conventional communication system includes a transmitting device and a receiving device. In some communication systems, the same device performs transmitting and receiving. For example, a router or a network switch may receive data on one interface and transmit data on a second interface. Individual streams of data are typically communicated between the transmitting device and the receiving device. With the advent of the Internet and the requirement for increased bandwidth, data is now transmitted in parallel, between communications devices.

Timing synchronization between transmitter and receiver is required to accomplish communication. Memories are typically used to synchronize data. Conventional communication systems include systems where the transmitter and receiver are based on the same clock and systems where the transmitter and receiver are based on different clocks (e.g. one in the transmitter and one in the receiver). In synchronous communication systems the transmitter and receiver are based on the same clock or timing information. In asynchronous communication systems the transmitter and receiver are based on different clocks. Therefore in asynchronous communications, the transmitter and receiver may have different time domains. As a result, there is a need to re-synchronize communicated data. A memory in the receiving device is often used for this purpose. The memory re-synchronizes the data. Typically the type of memory used, is called a First-in, First-out (FIFO) memory.

A FIFO memory synchronizes data by performing a number of functions. For example a FIFO memory stores and processes data in the order that the data is received. In a conventional FIFO memory data is written into a memory space based on a first time domain and data is read out of the memory space based on a second time domain.

An asynchronous FIFO memory may include two timing domains. One domain is based on the transmitter clock and the second domain is based on the receiver clock. Writing data into the FIFO is performed based on the transmitter clock and reading data out of the FIFO is based on the receiver clock. Pointers are used to identify a memory location, in the FIFO, where data will be written into and where data will be read. A write pointer identifies a memory location that data will be written into. A read pointer identifies a memory location that data will be read from. Both the write pointer and read pointer move sequentially through the FIFO memory based on the transmitter clock and the receiver clock, respectively. In a conventional FIFO, the write pointer is based on the transmitter (e.g. input) clock and the read pointer is based on the receiver (e.g. output) clock.

In conventional systems, techniques are implemented to ensure that the write pointer and read pointer work in a cooperative relationship. For example, forced spacing between the write pointer and the read pointer may be implemented or testing will be performed on a memory space, to ensure that the memory space is written to and read from, at the right time.

To coordinate reading and writing, the location of the write and read pointers must be known. In addition, the speed that the pointers sequentially step through the memory must be managed. A number of techniques have been developed to coordinate reading and writing in the memory space and to manage the speed that the pointers move through the memory. For example, special characters may be sent in a communicated bit stream. The special characters cause the write pointer to advance while the read pointer remains stationary. In an alternative technique, the write pointer and read pointer may be spaced so that they don't overlap during operation.

Although the foregoing techniques are applicable to individual communications links, a number of newer communication systems include multiple communication links (e.g. multiple channels, multiple lanes), each communicating information in parallel. In the new communication systems, data is simultaneously transmitted across each link. The data is striped across each of the links and then consolidated in a memory such as a FIFO memory, located in a receiver.

Several additional timing issues result from communicating information in parallel. In systems that transmit information in parallel, although each link is based on the same transmitter clock, the data transmitted on each link may arrive at the receiver out of phase. In addition, the transmitter clock is different from the receiver clock. Lastly, intermediate communicating devices such as repeaters, may create further disparity between the data communicated on multiple parallel links. Ultimately, as a result of a combination of these effects, data communicated on different links may arrive in the receiver at different times. When data from different links arrives at the receiver at different times, the data is defined as skewed.

Skewed data causes many communications problems. For example, as a result of a mismatch between the read clock and the write clock, valid data may be incorrectly read from the FIFO storing the data. Data has to arrive at the FIFO before the write and read pointers begin to move through the FIFO. If data arrives on communication links at different (e.g. skewed) times, the pointers in each FIFO memory may move out of synchronization and move in an uncoordinated manner. For example, the data associated with one link may arrive in the FIFO and is ready to be read, however, the data associated with another link may not have arrived and is not available for reading. In this scenario, if information is read out of the FIFO, part of the information would be valid data, but part of the information may be invalid data (e.g. information associated with the second link).

In addition to the problems associated with aligning data and synchronizing data, a receiving system may stop operating or operate incorrectly as a result of the foregoing issues. In addition, simple operator error such as plugging cables into the wrong receptacle or improperly configuring the system may cause the system to incorrectly align or synchronize incoming data. When these issues occur, it is difficult to reconfigure the system. The system may hang or just continue to operate incorrectly.

Thus, in a scenario including several communications links, there is a need to coordinate data communicated across each link. There is a need to resynchronize data in a receiver. There is a need to coordinate writing data into a FIFO and reading data out of the FIFO when the writing is based on one time domain and the reading is based on a second, different time domain. There is a need to restart the system, so that the system does not hang or continue to operate incorrectly.

SUMMARY OF THE INVENTION

The present invention is directed to a method of operating a system receiving information on multiple communications links. Multiple parallel communication links connect a transmitter and a receiver. A data stream is transported on each communication link. Transmitted data may be striped across individual links. The data streams are stored in a FIFO memory located in the receiver. One FIFO memory is associated with each link and receives the data communicated on the link. The FIFO memory uses the transmitter clock to write (e.g. input) data and the receiver clock to read (e.g. output) data. A state machine controls each FIFO memory. A state machines also controls the collection of FIFO's.

In one embodiment of the present invention, the state machine(s) include three states. A first state, that controls the system when one link is operating, a second state that controls the system when multiple links are operating and a third state which resets the system and transitions between the first state and the second state. For example, the system operates in a deskew disable state when only one communication link is operating and in a deskew enabled state when multiple communication links are operating. Lastly, the system operates in a reset state, to reset the system and transition between the deskew enabled state and the deskew disabled state.

Various signals are defined to control the operation of the state machine and to trigger transitions between states. A self reset signal is implemented, the self reset signal will reset the FIFO, including the communication links and the write domain clock. A skew error signal is defined, the skew error signal identifies when the links are not aligned. A buffer error signal is defined. The buffer error occurs when there is an underflow condition or an overflow condition in the FIFO.

During operation, each link operates semi-autonomously. Data is stored in the memory and deskewed before reading the data out of the memory. Should an error or change of state occur, the system determines the current state and resets itself by moving to the reset state and then ultimately moving to the appropriate state of operation.

In one embodiment of the present invention, a system receives information on a plurality of links. The system comprises a first state machine. The first state machine generates first information, the first information representing operating status of one of the plurality of links; a second state machine, the second state machine generates second state information, the second information representing operating status of the plurality of links; and a reset state machine, the reset state machine generates reset information in response to the first information and in response to the second information, the reset information representing a transition between the first state machine and the second state machine; the system resetting in response the reset information.

A method of operating a system is presented. The system receives information on a plurality of links, the method comprises the steps of operating a first state machine, the first state machine generates first information, the first information representing operating status of one of the plurality of links; operating a second state machine, the second state machine generating second information, the second information representing operating status of the plurality of links; operating a reset state machine, the reset state machine generating reset information in response to the first information and in response to the second information, the reset information representing a transition between the first state machine and the second state machine; and resetting the system in response the reset information.

A method of operating a system receiving information on a plurality of links is presented. The method comprises the steps of operating in a reset state, wherein the reset state identifies that the system is resetting; testing system operations while in the reset state, wherein system operations identifies which of the plurality of links is operating; and operating in a deskew disabled state in response to testing the system operation, wherein the deskew disabled state is implemented when the system disables deskewing between the plurality of links.

A method of operating a system comprises the steps of operating in a reset state, wherein the reset state identifies that the system is resetting; testing system operations when in the reset state, wherein system operations identifies which of the plurality of links is operating; and operating in a deskew enabled state in response to testing the system operation, wherein the deskew enabled state is implemented when the system enables deskewing between the plurality of links.

A method of operating a system comprises the steps of generating first test information in response to testing for skew error; generating second test information in response to testing for a buffer error; generating third test information in response to testing to determine if deskew is enabled; and resetting the system in response to the first test information, in response to the second test information and in response to the third test information.

A system comprises a plurality of deserializers each capable of receiving an input data stream; a plurality of memories each coupled to one of the plurality of de-serializers, each of the plurality of memories storing input information in response to the input data stream received by the plurality of de-serializers; and a state machine coupled to the plurality of memories, the state machine resetting the system in response to the input information stored in the memory.

A method of operating a system receiving information on a plurality of links, the plurality of links capable of transporting the information in parallel, the method comprises the steps of operating in a first state, the first state representing operation of one of the plurality of links, the first state including a number of first error conditions; operating in a second state, the second state representing operation of the plurality of links, the second state including a number of second error conditions; and resetting the system in response to the first error conditions and in response to the second error conditions.

DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

A method and apparatus is presented which may be implemented in a communication system including one link or multiple links. It should be appreciated that the methodology may be applied to any communication system with a transmitter and receiver. Communication systems, which are defined by a transmitter and receiver, may include systems with a transmitter communicating with a receiver across a medium. The medium may be wireless or wireline. Further the transmitter may be directly coupled to the receiver or communicate across a network.

Communication systems, which are defined by a transmitter and receiver, may include communications devices such as switches or routers, which have both a transmitter interface, and a receiver interface included in the switch or router. Communication systems, which are defined, by a transmitter and receiver may include systems in which a transmitter interface and a receiver interface are located in the same device and are communicating across a back-plane or bus of the device. Further a communication system may include a single interface, which includes a transmitter and receiver transmitting information across the interface. It should be appreciated that the method and apparatus may be applied to any system that includes a memory such as a communication/computing system that includes a FIFO memory.

A number of communication protocols have developed to facilitate transmission of information across disparate devices. Although the method and apparatus may be discussed with respect to several sample protocols, it should be appreciated that the method and apparatus is applicable to a number of protocols. The method and apparatus may be implemented in systems operating with any protocol that is compliant with the Open System Interconnection model (OSI) such as the Transmission Control Protocol/Internet protocol, Synchronous Optical Networking (SONET), the Peripheral Communications Interface (PCI) or the Infiniband Architecture (IBA). In one embodiment of the present invention, the method and apparatus of the present invention is implemented in an Infiniband architecture (IBA).

The OSI model defines a number of communication layers such as an end-user layer, a session layer, a transport layer, a network layer and a physical layer. Each layer defines system functionality. Equipment manufacturers develop technology that is compliant with the OSI architecture so that their products will be compatible with products developed by other manufacturers. Therefore once a product is built such that it is compliant with the protocol, the products should be able to work together, regardless of the manufacturer.

In one embodiment of the present invention an IBA is implemented. The IBA defines the components of a network. For example, the IBA facilitates the connection of multiple independent processor platforms. The IBA defines a communication and management infrastructure, which supports both input and output as well as inter-process communication between computer and communication systems. Devices in an IBA are classified as switches, routers, channel adapters, repeaters, links that interconnect switches, routers, repeaters, and channel adapters.

Since the IBA is compliant with the OSI architecture, the IBA implements an end-user layer, a session layer, a transport layer, a network layer and a physical layer. In the IBA the various layers are implemented as upper-level services, which include end-users or consumer functionality and lower level functionality such as transport layer functionality, network layer functionality, link layer functionality and physical layer functionality. Upper-level services are performed in end-user devices and lower-level services such as the transport layer, network layer and physically layer services, may be performed by network communications devices.

In the IBA links interconnect channel adapters, switches, and repeaters to form a fabric. Channel adapters are defined as devices that are located in processor nodes and consume packets. Switches are defined as devices, which receive packets and forward them along to a destination. Routers receive packets, replace the header information and then forward the packets to the next destination.

Many communication systems and protocols allow for the communication of data on several paths, simultaneously. As a result, data may be byte striped across these communication links. The present invention may be implemented with communication systems that include a single channel (e.g. link) or with communication systems that include multiple channels (e.g. links). In addition, data may be byte striped across the various channels.

The IBA defines three alternative parallel link configurations. The specific link configuration varies depending on whether the links are implemented electrically or optically. For example, the IBA defines a 1× path, a 4× path and a 12× path. However, it should be appreciated that the method and apparatus of the present invention may be implemented regardless of the number of paths. In addition, the method and apparatus of the present invention may be implemented in other systems that are not compliant with the IBA, but communicate information across multiple links.

In the 1× implementation using electrical technology, two differential pairs of wires are used per direction, for a total of 4 wires. In an optical implementation 1 transmit path and one receive path is used for a total of 2 fibers. In the 4× implementation using electrical technology, eight differential pairs of wires are used, four per direction, for a total of 16 wires. In the optical implementation, four transmit fibers and four receive fibers are used for a total of eight fibers. In the 12× implementation using electrical technology, 24 differential pairs of wires are used, 12 per direction, for a total of 48 wires. In an optical implementation 12 transmit fibers and 12 receive fibers are used for a total of 24 fibers.

In a communication system implemented in accordance with the teachings of the present invention a serial bit-stream may be used to communicate information between a transmitter and a receiver. The serial bit-stream may be communicated across one communications path or striped across several communications paths. For example, in the IBA a serial bit-stream may be communicated across a transmitter receiver pair configured in a 1× configuration, a 4× configuration or a 12× configuration.

As mentioned above, in a communication system, several links (e.g. data paths) may be established between the transmitter and receiver; in addition, data may be striped across the individual links. When data is striped across a link whether it is an IBA compliant system or a non-IBA compliant system, each byte is communicated on each individual path and then the data is recombined in the receiver. For example byte 1 would be communicated on link 1, byte 2 would be communicated on link 2, byte three would be communicated on link 3 and byte 4 would be communicated on link 4.

The data that is received on a single communications path or striped across the various communications paths is subsequently stored in a memory in the receiver. The receiver memory is typically a FIFO receiver memory. The receiver memory receives and writes the data into the FIFO memory with the clock of the transmitting device and reads the data out of the FIFO memory with the clock of the receiving device. As a result, there are two time domains, a transmitting device time domain and a receiving device time domain. The FIFO implemented in accordance with the teachings of the present invention compensates for any differences in the two time domains.

In one embodiment of the present invention, several communications links connect a transmitter to a receiver. Each communications link independently transfers data to the receiver. The receiver includes a single FIFO memory or several FIFO memories. Each link transfers data to one FIFO. Although each link communicates data based on the same clock (e.g. timing information), as a result of time delays in the communications link, the data arrives at the receiver (e.g. FIFO) out of phase and is realigned by the FIFO. The information is written into the FIFO using the timing information from the communicated bit stream. The information is then read out of the FIFO using the receiver clock.

The FIFO begins operation with a write pointer and a read pointer pointing at the same memory location. The write pointer operates based on the transmitter or input clock and the read pointer operates based on the receiver or output clock. As data is received in the FIFO and stored in the FIFO, the write pointer advances sequentially and points to new memory locations. The read pointer also advances sequentially and points to new memory locations. The memory locations pointed to by the write pointer, are the memory locations that store the incoming data. The memory locations pointed to by the read pointer are the memory locations from which data will be read. Should the write pointer move faster than the read pointer the memory is said to have an overflow condition. Should the read pointer move faster than the write pointer, the memory is said to have an underflow condition.

In the method and apparatus of the present invention a FIFO is associated with each link. As a result, several write and read pointers are operational when multiple links are communicating data. A state machine is associated with each FIFO, receiving information from a link and a state machine is associated with the collection of FIFO's (e.g. block memory). The state machines facilitate the reset of the FIFO's during operation.

The present invention may be implemented for one link such as a 1× mode of operation, where a 1× mode of operation would designate an IBA compliant system operating in 1× mode; or the present invention may be implemented in a 4× mode or a 12× mode of operation, where a 4× mode of operation and a 12× mode of operation represent an IBA system operating in a 4× mode or a 12× mode, respectively. However, it should be appreciated that the method and apparatus of the present invention may scale to any number of parallel paths in an IBA system or in another type of architecture.

In one embodiment of the present invention, an elastic FIFO is used. An elastic FIFO is a FIFO that continuously processes data that is input to the FIFO, at a different rate, than the rate that the data is read out of the FIFO. The elastic FIFO memory primarily resides in the Physical Layer of the OSI model, however, operation of the FIFO involves functionality implemented in a number of layers of the OSI model.

In one embodiment of the present invention, a number of serializer/de-serializer (e.g. serdes) units are positioned at the input of the receiving device. One communication link is associated with each serdes and byte striped information is communicated across each communication link to the serdes. For example, in a 4× Mode of operation the receiver may include 4 serdes. In an implementation with four serdes, the serdes each receives a serial data input on four separate individual links. Each serdes may then output a ten bit streams of data for a total of 40 bits. The ten bits consist of eight bits of data, one control bit and one clock bit. Each stream of data is stored in a FIFO. The four data streams are transmitted using the clock domain of the transmitting device. The FIFO is used to deskew (e.g. align) the incoming data and buffer the data so that the data may be read, based on the clock domain of the receiving device.

In one implementation of the present invention control characters such as skip symbols (e.g. sequence of characters) are sent to allow the elastic FIFO to match the rates of the transmitting device and the receiving device (e.g. rate match). The elastic FIFO may rate match by adding or deleting characters in the incoming bit stream to compensate for whether information is written into the FIFO, too quickly or too slowly. A state machine enables the FIFO to monitor and control the coordination of pointers, to ensure that reading information out of the FIFO and writing information into the FIFO is coordinated. For example, in one embodiment of the present invention, the state machine manages the spacing of the read and write pointers.

During operation, a data stream is communicated on each link. In a 4× configuration four data streams are transmitted, one on each link. In one embodiment of the present invention, a state machine is implemented on the read side of the FIFO memory. Each link carries a sequence of bytes, striped across the links. The data stream is stored in a FIFO memory located in the receiver. The data stream is written into the FIFO memory and stored in the FIFO memory, located in the receiver.

In one embodiment of the present invention, alignment of the data (e.g. deskewing) is performed on the read side of the FIFO. The Serdes converts the serial bit stream to a parallel word. The word is written into the FIFO (e.g. one byte per FIFO) and the word is stored in the FIFO. A limit is typically set for the maximum amount of skew in the system, for example, in the IBA, the links may be skewed by a maximum of six bytes.

The present invention will be discussed with respect to a 4× implementation. Using a 4× implementation, the FIFO gets four bytes of data on every clock cycle. The state machine is implemented so that when the FIFO presents the data for reading, the data is aligned (e.g. the data is in the same sequence that it was sent). It should be appreciated that the methodology may be scaled to accommodate a greater number of links. In addition, the number of bytes read at one time or the methods of reading the bytes may be changed and still remain within the teachings of the present invention.

In the method and apparatus of the present invention a training period is implemented which enables the FIFO to deskew the data. For example, in the IBA, the training period is 16 characters long. In performing the training, a special character is sent by the transmitter on all four links (e.g. channels) at the same time. The receiver on the read side of the FIFO waits to receive the characters. For example, in the IBA implementation, a comma (e.g. special character) is sent on all links at the same time. The receiver on the read side of the FIFO waits for the comma character and realigns the data based on the comma character.

During operations, such as a startup, a training sequence is implemented and deskewing is performed. The transmitter sends an agreed upon symbol such as a comma on all links. The receiver waits to receive the comma on each link. During the wait time, the write pointers and the read pointers associated with each FIFO remain static. When the comma arrives from a link, the write pointer of the FIFO associated with that link begins to move. Until the FIFO receives the comma, all the pointers remain at the first memory location. After the write pointer begins moving, the write pointer continues to advance sequentially and writes information into the FIFO associated with the specific link.

As previously mentioned, each link and each FIFO associated with a link, waits until a comma is received. Each FIFO associated with a link functions independently under the control of a state machine, which controls the link. In addition, a system state machine controls the operation of all the FIFO's. Each FIFO waits to receive a special symbol such as a comma before the write pointer begins moving. Once the write pointer begins moving, the write pointer for that specific FIFO continues to move. In addition, the state machine continues to monitor the state of the receiver and the link. For example, a 1× state machine monitors the state of each individual link and a 4× state machine monitors all four links.

Figure 1:
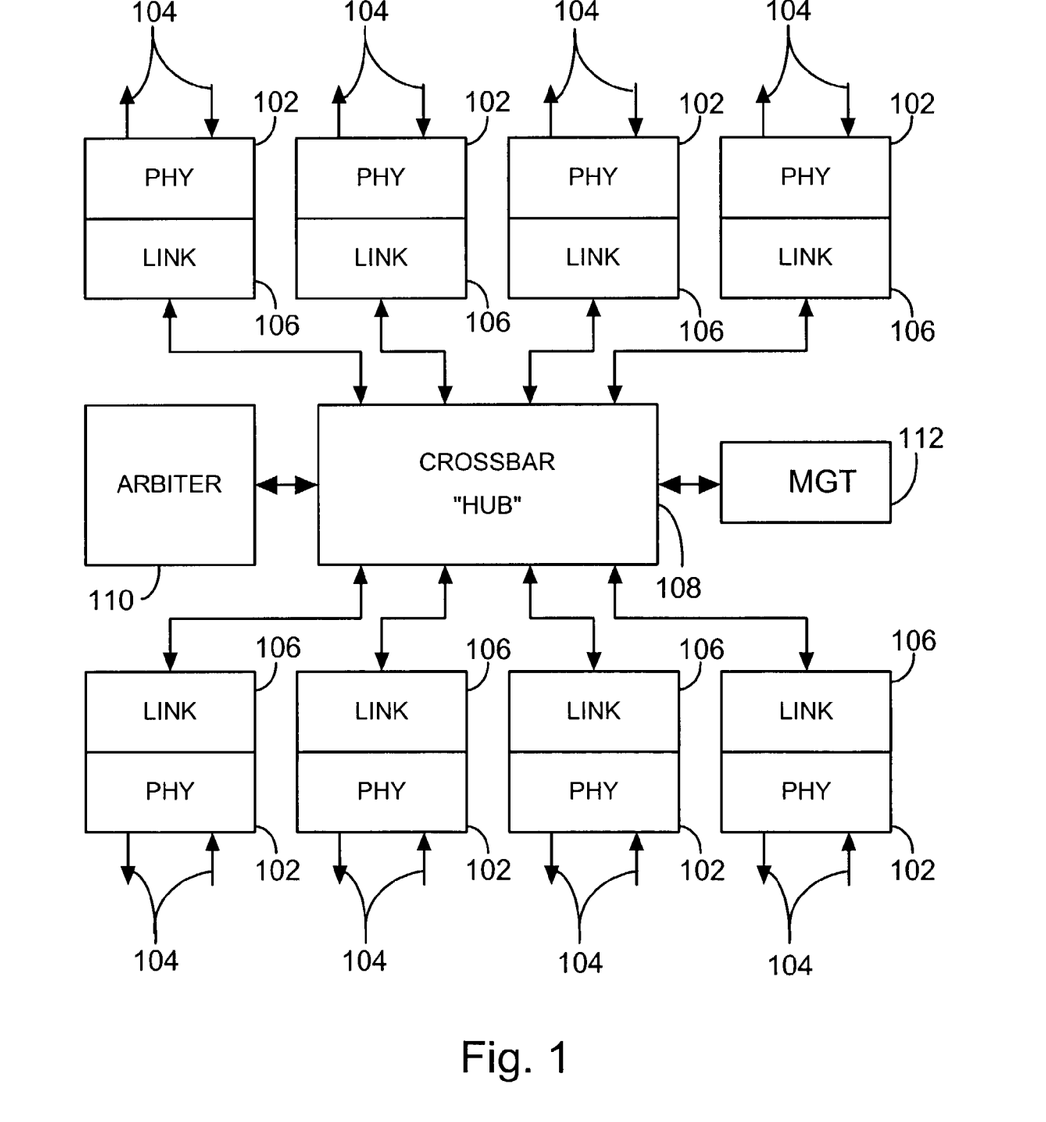
FIG. 1 displays a switch implementation of the present invention.

The method and apparatus of the present invention may be implemented in a number of communication devices and interfaces that are compliant with a number of OSI compliant protocols. For example, in FIG. 1 the method and apparatus of the present invention is implemented in an IBA compliant switch. The switch would represent the transmitter/receiver in a communication network. In FIG. 1 a physical layer block 102 is shown. The physical layer block 102 provides physical layer processing such as media control and signaling. For example, in the present embodiment, each physical layer block 102 may be configured for 1×, 4× or 12× communication as shown by 104. In the 1× configuration, one communication link is established from transmitter to receiver. In a 4× or 12× configuration, multiple communication links are established from transmitter to receiver. The physical layer also manages the media type such as twisted pair cabling or fiber optic cabling. In addition, data is striped across the communication links and consolidated in the receiver.

The physical layer block 102 interfaces with a link layer 106. The link layer 106 includes the logic and functionality of the present invention (e.g. a FIFO memory and associated logic). The link layer 106 connects to a crossbar switch 108, which switches incoming and outgoing traffic. The crossbar switch 108 is managed by a management block 112, which performs management functions and system test. An arbiter 110 is connected to the crossbar switch 108. The Arbiter 110 grants and denies access to the switch 108.

Figure 2:
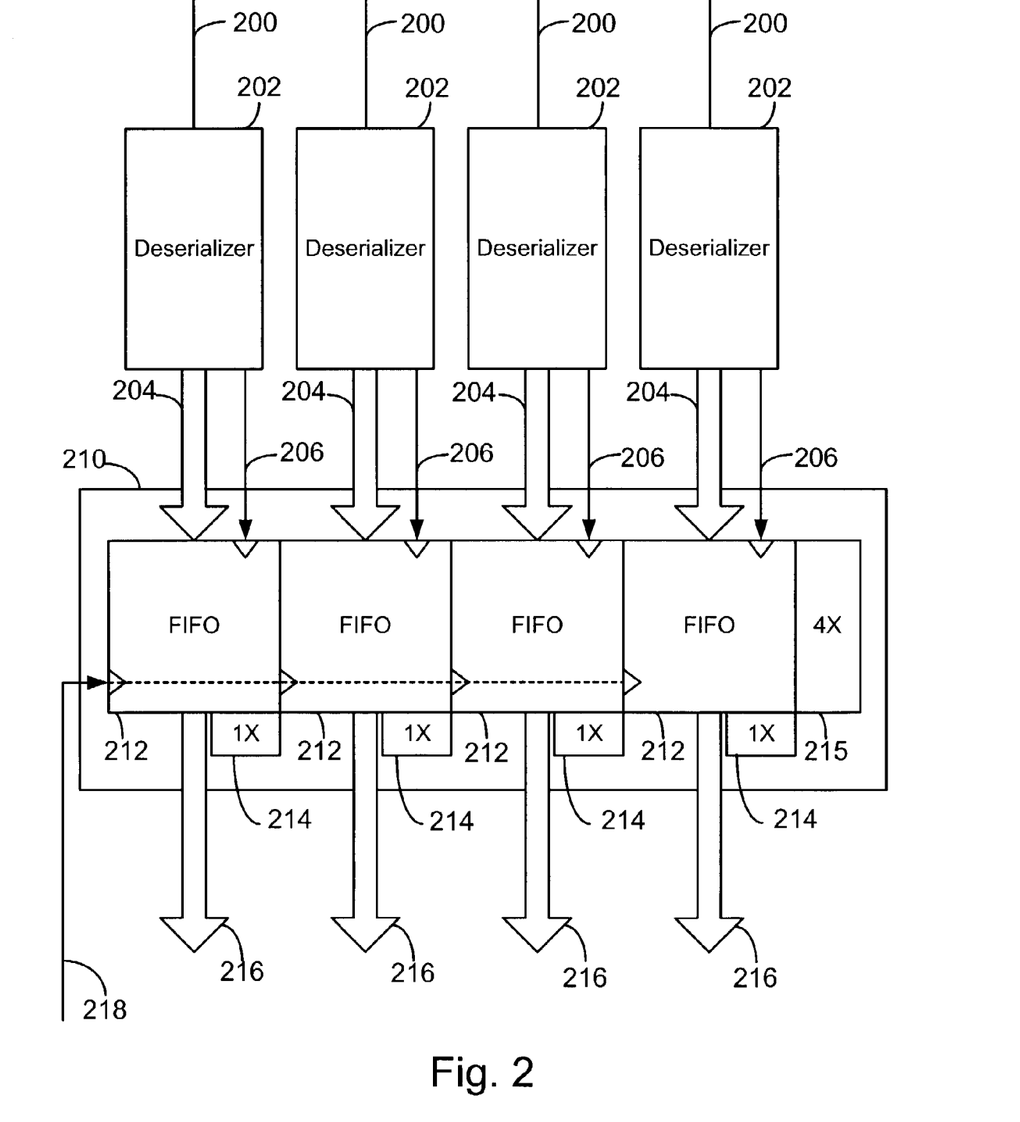
FIG. 2 displays an internal view of a link layer shown in FIG. 1.

An internal view of a portion of the link layer 106 of FIG. 1 is shown in FIG. 2. In FIG. 2, an incoming serial data stream is shown as 200. A de-serializer 202 takes the incoming serial data stream 200 and turns it into a parallel data stream 204. The parallel data stream 204 is communicated from the de-serializer 202 to a block memory 210. The parallel data stream 204 and a clock signal 206 are fed into individual FIFO memories 212. The individual FIFO memories 212 are each associated with and individual communications path such as the 1× configuration (e.g. 214) in the IBA. The block memory 214, which houses individual FIFOs 212, supports four communications paths 204, (e.g. a 4× configuration shown as 215).

An incoming clock signal 206 is also recovered from the incoming serial bit-stream 200. The individual FIFO buffers 212 receive the incoming data and incoming clock and re-synchronize the data based on a receiver system clock. The receiver system clock signal is output from the individual FIFOs as shown by 218. As a result, the data is re-synchronized to the receiver system clock.

Figure 3:
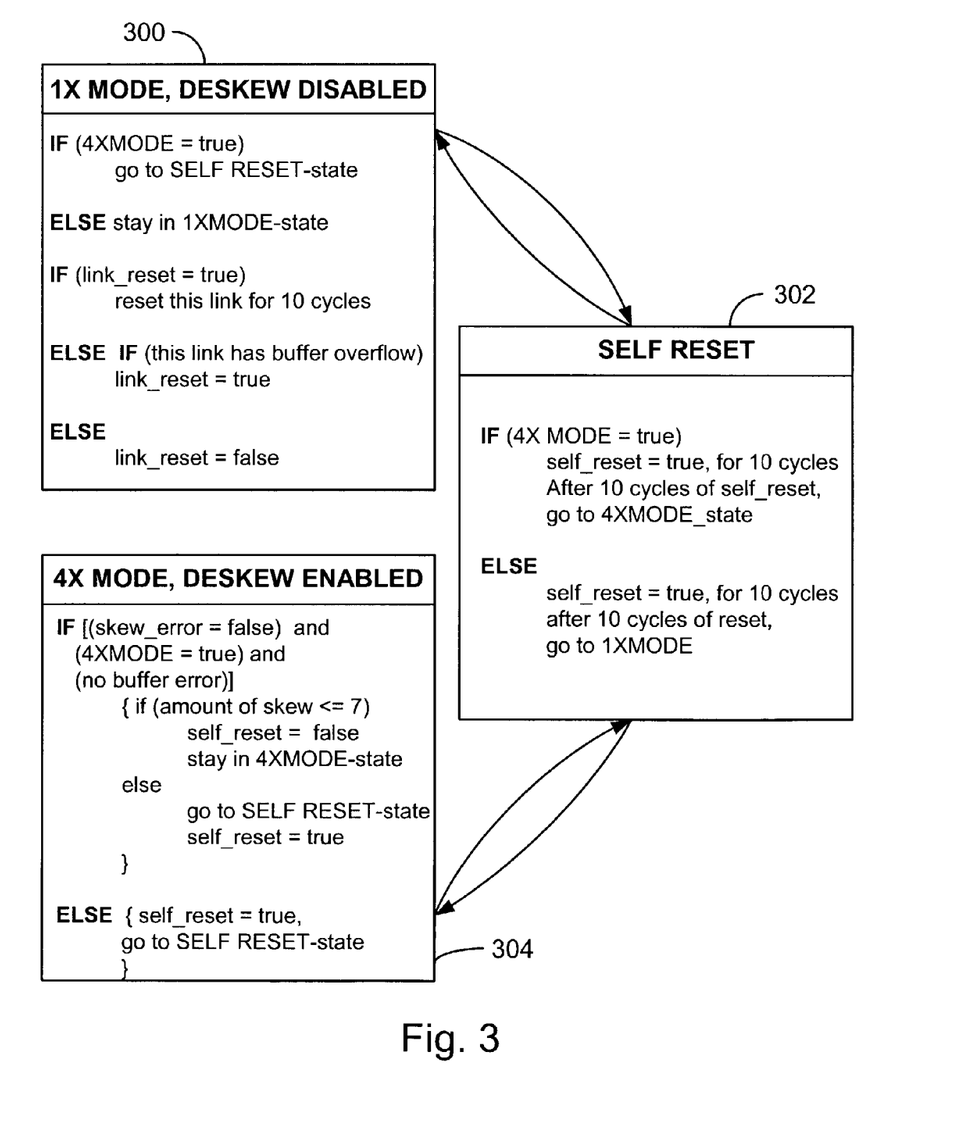
FIG. 3 displays a state diagram implementing the method and apparatus of the present invention.

A state machine implementing a method of the present invention is shown in FIG. 3. The state machine shown in FIG. 3 may be considered three state machines or one state machine operating in three states. In addition the method is implemented with the IBA. The states include a 1×MODE state 300, a SELF_RESET state 302 and a 4×MODE state 304. Alternatively, the 1×MODE 300, the SELF_RESET state 302 and the 4×MODE state 304, may each be considered an independent state machine.

In one embodiment of the present invention, the state machine(s) shown in FIG. 3 may be implemented in hardware with digital logic devices and circuits. In another embodiment, the state machine(s) may be implemented with computer instruction such as software on a multipurpose computer. Lastly, the state machine(s) may be implemented with a combination of hardware and software.

In one embodiment of the present invention, a system operates in three logical states. The system is in a first state when the system is communicating on one link. A second state is implemented when the system is communicating on multiple links and the system is operating in a third state when the system resets between the first state and the second state. The system either operates using one link or the system operates using multiple links. The system uses the reset state as a transitional state, to transition between states when one link is operating or when multiple links are operating. When just one link is operating, deskewing is disabled. When multiple links are operating deskewing is enabled. Lastly, multiple tests may be implemented in each state to manage anticipated failures in the system. As a result, the system is able to manage known failures and self reset when failures occur.

In one embodiment of the present invention, the system starts in 1×MODE. During 1×MODE deskewing is disabled. While operating in 1×MODE, the system performs a link test and a link reset. Each link functions independently. For example, link 1 can reset while link 3 is functioning normally. A test is then made to determine if the FIFO associated with the link, has a buffer overflow condition. If there is a buffer overflow condition, a link variable is set to true, otherwise the link variable is set to false.

If the system is not operating in 1×MODE and is operating in 4×MODE, the system will self reset to move into 4×MODE. To self reset, the system goes into a self reset state. The system transitions between modes by going through the self reset state. In the self reset state the system test to determine whether 1×MODE is true or whether the 4×MODE mode it true. A time period is allowed to elapse if the system transitions to 1×MODE out of the self reset state. Similarly, a time period is allowed to elapse if the system transitions to the 4×MODE out of the self reset state. For example, in one implementation of the present invention, the time period is set to 10 cycles.

Assuming that the system is going to transition to 4×MODE, a check is made of possible error conditions to determine the state of the system. It should be appreciated that any number of error conditions may be tested to determine the health of the system. Assuming that there are no error conditions, a second test is made to determine if the system is operating within specification. It should be appreciated that multiple test may be made to determine whether the system is within specification. Based on the results of both test conditions, the system will either stay in 4×MODE or go back to the self reset state. Once again, based on the testing in the self reset state, the system may transition to 1×MODE or 4×MODE.

While the method is implemented in a system that has 4×MODE capability, the method may also be scaled to work with a system that is configured for 12× mode. Further, the method may be implemented in a system that has a transmitter receiver connection, where the receiver includes a memory receiving information in parallel.

A number of error conditions are anticipated. The error conditions are defined using variables. The variables are implemented as signals that are communicated through the logic of the system. A self reset (e.g. self_reset) variable is implemented. The self reset variable will reset the entire FIFO including the links and write domain clock. A skew error (e.g. skew_err) variable is defined. When the skew error signal is triggered, it denotes that the four links (e.g. in a 4× implementation) are not aligned. This is detected using the special character, such as the comma as described above. A buffer error (e.g. buffer_err) variable is defined. The buffer error variable is true when there is underflow or overflow in the FIFO. A link reset (e.g. link_reset) variable designates whether a link has been reset. A 4×MODE variable is defined, the 4×MODE variable is set to true when the system is operating in 4×MODE and to false when the system is operating in 1×MODE. Lastly, the maximum amount of skew that the system will tolerate is also defined. For example, in one method of the present invention, the amount of skew that the FIFO will tolerate is less than or equal to 7.

The 1×MODE state 300 is implemented when the system is running in 1× mode. During 1×MODE each link is working independently. Therefore, the state machine may be used in a scenario where there is a single communication link. In the 1×MODE there is no need to deskew the data, since only one link is operating, therefore deskewing is disabled.

In 1×MODE 300, a state machine test to determine if the system (e.g. receiver) is in 4×MODE. If the system is in 4×MODE the system will go to the SELF_RESET state 302, however, if the system is not in 4×MODE the system will stay in the current state, which is the 1×MODE state 300. After the initial test the 4×MODE variable is set to false, since the system is not in 4×MODE and the state machine remains in the 1×MODE 300.

In 1×MODE, a test is made of the specific link using the link_reset variable. If the link_reset variable is true then the link is reset for a number of cycles. For example, the link may be reset for a period of cycles such as 10 cycles. The number of cycles is defined as the amount of cycles required to hold the reset signal long enough to synchronize the write domain clock. If the link_reset is false, then a test is made to determine if the link has a buffer overflow condition; meaning that the write pointer is moving ahead of the read pointer and writing over information that has not been read. If the link does have a buffer overflow condition then the link_reset is set to true. If the link does not have buffer overflow, then the link_reset is set to false. It should be appreciated that although the test was made for buffer overflow, the test could easily be made for buffer underflow.

The SELF_RESET mode 302 is implemented any time that it is necessary to reset the system. The system may move to the SELF_RESET state 302 from the 1×MODE state 300 or from the 4×MODE state 304. The SELF_RESET state 302 may be used when the system is in start-up mode, when the system is training or when the system is restarting.

The self_reset signal is held for 10 cycles in order to prevent the elastic FIFO from falling into an infinite loop. This is to ensure that the reset signal propagates all the way to the write domain. The propagation delay is implemented to ensure synchronization between the read domain (e.g. core clock) and the write domain (e.g. transmitter or input clock).

In the SELF_RESET state 302 a test is made of the 4×MODE variable to determine if the system is in 4×MODE. If the system is in 4×MODE a self_reset variable is set to true for 10 cycles. After 10 cycles of self reset, the state machine will go to the 4×MODE state 304. If the system is not in 4×MODE the self_reset variable is set true for 10 cycles of self reset. After 10 cycles of self reset time, the state machine will go to the 1×MODE state.

The 4×MODE state 304 is implemented when the system is running in 4×MODE. During 4×MODE all the channels are working together. For example, in 4×MODE deskew operations are enabled.

In the 4×MODE 304, a test is made of the skew error, the mode of operation and the buffer. For example, If the skew_error variable is false, the 4×MODE variable is true or there is no buffer error, then the state machine test for the amount of skew, otherwise the state machine goes to the SELF_RESET state. When testing for the amount of skew, if the amount of skew is less than or equal to a defined system number such as 7; and the self reset variable is false, the system will stay in the 4×MODE. The defined system number is normally a number that is identified to maintain compliance with the architecture that is implemented (e.g. IBA). If the amount of skew is greater than 7, the state machine moves to the SELF_RESET state and the self_reset variable is set to true. If there is a skew error, the system is in 4×MODE and there is a buffer error, then the self_reset variable is set to true and the state machine moves to the SELF_RESET state.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A system receiving a first input stream of data, the system comprising:
   a plurality of deserializers generating a second input stream of data in response to the first input stream of data and generating stripped data in response to the first input stream of data;
   a system FIFO memory coupled to the plurality of deserializers, the system FIFO memory receiving the second input stream of data and receiving the stripped data, the system FIFO comprising a plurality of individual FIFO memories, each of the individual FIFO memories corresponding to one of the plurality of deserializers;

a system state machine controlling the system FIFO memory, the system state machine comprising, a first state machine controlling one of the individual FIFO memories which corresponds with one of the plurality of deserializers, the first state machine operating in deskew disabled mode where deskewing is disabled causing said one of the plurality of individual FIFO memories under control of the first state machine to receive the second input stream of data;

a second state machine controlling the system FIFO, the second state machine operating in deskew disabled mode where deskewing is disabled causing each of the plurality of individual FIFO memories to receive the stripped data; and a reset state machine controlling transition between the deskew enabled mode and the deskew disabled mode.

2. A system as set forth in claim 1, wherein the system is a communication switch.

3. A system as set forth in claim 1, wherein the system is an elastic first-in, first-out memory.

4. A system as set forth in claim 1, wherein the system is an infiniband architecture compliant system.

5. A system as set forth in claim 1, wherein the first state machine, the second state machine and the reset state machine are implemented with digital logic.

6. A system as set forth in claim 1, wherein the first state machine, the second state machine and the reset state machine are implemented in a multipurpose computing machine running computer software.

7. A system as set forth in claim 1, wherein the state machine is a reset state machine causing the system to automatically reset.

8. A system as set forth in claim 1, further comprising a self reset signal generated while operating the reset state machine, the self reset signal causing the system FIFO to reset.

9. A system as set forth in claim 1, further comprising a skew error signal generated while operating the second state machine, the skew error signal denoting that the stripped data is not aligned.

10. A system as set forth in claim 1, further comprising a buffer error signal denoting that the system FIFO has an overflow condition.

11. A system as set forth in claim 1, further comprising a buffer error signal denoting that the system FIFO has an underflow condition.

12. A system as set forth in claim 1, further comprising a link reset signal generated while operating the first state machine, the link reset signal denoting that a link corresponding to said one of the plurality of individual FIFO memories under control of the first state machine is not operational.

13. A system as set forth in claim 1, further comprising a 4× mode operational variable which is set to true when deskew is disabled and set to false when deskew is enabled.

14. A system as set forth in claim 1, further comprising a skew variable defining the maximum amount of skew that the system will tolerate.

15. A communication system comprising:

a system FIFO memory comprising a plurality of individual FIFO memories;

a system state machine controlling the system FIFO, the system state machine comprising, a first state machine controlling the plurality of individual FIFO memories, the first state machine operating in deskew disabled mode where deskewing is disabled causing at least one of the plurality of individual FIFO memories under control of the first state machine to output a first output stream of data;

a second state machine controlling the system FIFO memory, the second state machine operating in deskew enabled mode where deskewing is enabled causing each of the plurality of individual FIFO memories to each output stripped data;

a reset state machine controlling transition between the deskew enabled mode and the deskew disabled mode;

a plurality of serializers coupled to the system FIFO memory and each coupled to at least one of the plurality of individual FIFOs, each of the plurality of serializers communicating the first output stream of data and communicating the stripped data; and an output coupled to the plurality of serializers, the output communicating a serial bitstream in response to the first output stream of data and in response to the stripped data.

16. A system as set forth in claim 1, wherein the communication system communication switch.

17. A system as set forth in claim 15, wherein the system FIFO is an elastic first-in, first-out memory.

18. A system as set forth in claim 15, wherein the communication system is an Infiniband architecture compliant system.

19. A system as set forth in claim 15, wherein the first state machine, the second state machine and the reset state machine are implemented with digital logic.

20. A system as set forth in claim 15, wherein the first state machine, the second state machine and the reset state machine are implemented with computer instructions.

* * * * *